United States Patent [19]

Ono

[11] Patent Number: 4,974,365
[45] Date of Patent: Dec. 4, 1990

[54] AUTOMOTIVE DOOR STRUCTURE

[75] Inventor: Jun Ono, Tochigi, Japan

[73] Assignee: Honda Giken Kogyo Kabushiki Kaisha, Tokyo, Japan

[21] Appl. No.: 396,707

[22] Filed: Aug. 22, 1989

[30] Foreign Application Priority Data

Aug. 25, 1988 [JP] Japan .................. 63-212712

[51] Int. Cl.⁵ .................................... B60J 5/04
[52] U.S. Cl. ............................ 49/502; 49/348; 49/385; 49/503
[58] Field of Search ............. 49/348, 385, 502, 503; 296/146

[56] References Cited

U.S. PATENT DOCUMENTS

| | | | |
|---|---|---|---|
| 2,475,985 | 7/1949 | Parsons | 49/385 X |
| 3,273,285 | 9/1966 | Champion | 49/385 X |
| 4,605,260 | 8/1986 | Sakakibara et al. | 296/146 X |
| 4,606,148 | 8/1986 | Gandini | 49/502 |
| 4,632,447 | 12/1986 | Nomura et al. | 296/146 X |
| 4,648,208 | 3/1987 | Baldamus et al. | 49/502 |
| 4,704,822 | 11/1987 | Srock et al. | 49/502 |
| 4,743,062 | 5/1988 | McLaren et al. | 49/502 X |
| 4,800,638 | 1/1989 | Herringshaw et al. | 49/502 X |
| 4,831,710 | 5/1989 | Katoh et al. | 49/502 X |

FOREIGN PATENT DOCUMENTS

| | | |
|---|---|---|
| 0128621 | 12/1984 | European Pat. Off. . |
| 0142435 | 5/1985 | European Pat. Off. . |
| 0199970 | 12/1986 | European Pat. Off. . |
| 0204997 | 12/1986 | European Pat. Off. . |
| 0208188 | 1/1987 | European Pat. Off. . |
| 59-8886 | 3/1984 | Japan . |
| 1392710 | 4/1975 | United Kingdom . |
| 2191156A | 12/1987 | United Kingdom . |

OTHER PUBLICATIONS

WO 81/03467 (BUDD)–inner and outer plastic shells 12, 14.
WO 85/05599 A (BUDO)–equipment to US 4769.951.

Primary Examiner—Philip C. Kannan
Attorney, Agent, or Firm—Armstrong, Nikaido, Marmelstein, Kubovcik & Murray

[57] ABSTRACT

An automotive door structure includes a door panel assembly of resin, a lifting/lowering device for lifting and lowering a door glass sheet, the lifting/lowering device being disposed in the door panel assembly, and a door frame of a rigid material disposed in the door panel assembly and supporting the door glass sheet and the lifting/lowering device.

9 Claims, 7 Drawing Sheets

FIG.6

AUTOMOTIVE DOOR STRUCTURE

BACKGROUND OF THE INVENTION

1. Field of the Invention

The present invention relates to a door structure, and more particularly to an automotive door structure.

2. Description of the Relevant Art

Automotive doors have door glass sheets and door glass lifting/lowering devices. Heretofore, an automotive door comprises an inner panel and an outer panel which are joined to each other by welding or the like, and the door glass sheet and the door glass lifting/lowering device are mounted on one of the inner and outer panels.

The door glass sheet and the door glass lifting/lowering device are relatively heavy. Therefore, at least one of the inner and outer door panels, which supports the door glass sheet and the door glass lifting/lowering device, has to be constructed of a rigid material such as an iron sheet or the like. As a result, the automotive door structure is of large weight as a whole. The door glass lifting/lowering device cannot easily be assembled in place since it must be inserted into the gap between the inner and outer door panels after they have been joined to each other.

The door glass lifting/lowering device comprises a link mechanism which supports a lower portion of the door glass sheet, an operating handle mounted on the inner side of the door, a component such as a sector gear disposed between the link mechanism and the operating handle, a holder guide for lifting and lowering the door glass sheet accurately, and a vibroisolating mechanism for preventing the door glass sheet from vibrating. The conventional door glass lifting/lowering device is made up of a large number of parts, and is structurally complex. There has been a demand for an arrangement which allows the user to lift and lower the door glass sheet with a reduced force, so that the door glass sheet can be opened and closed easily.

Japanese Utility Model Publication No. 59-8886 published on Mar. 21, 1984 discloses a door checker mechanism for holding an automotive door in a certain open position such as a fully open position. The disclosed door checker mechanism comprises a horizontal lever having one end pivotally mounted on the automobile body and a bulging portion near its other end, a case fixed to an automotive door, the horizontal lever extending through the case, upper and lower shoe members housed in the case and sandwiching the horizontal lever vertically, resilient members of rubber for pressing the shoe members against the horizontal lever, and a stopper attached to the other end of the horizontal lever. When the door is fully opened, the stopper engages the case and the bulging portion of the lever is clamped between the upper and lower shoe members. As a result, the door remains open through the door checker mechanism. The door checker mechanism has many components and a complex structure. Another problem is that the horizontal lever makes the door checker mechanism large especially in the horizontal direction.

The present invention has been made with a view to effectively solving the problems of the conventional automotive door structure.

SUMMARY OF THE INVENTION

It is an object of the present invention to provide an automotive door structure which is reduced in weight and can be assembled with greater ease.

To accomplish the above object, there is provided according to the present invention a door structure for an automobile having an automobile body, comprising a door panel assembly of resin adapted to be openably and closably mounted on the automobile body, a door glass sheet vertically movably disposed in the door panel assembly, a lifting/lowering device for lifting and lowering the door glass sheet, the lifting/lowering device being disposed in the door panel assembly, and a door frame of a rigid material disposed in the door panel assembly and supporting the door glass sheet and the lifting/lowering device.

The door structure further includes a door lock mechanism for locking the door panel assembly on the automobile body, the door frame comprising a vertical frame having door hinges, a horizontal frame connecting the vertical frame to the door lock mechanism, and a guide member for guiding the door glass sheet as it is lifted or lowered, the guide member extending between the vertical frame and the horizontal frame.

The door lock mechanism comprises a lock base housing door lock members therein, an outer door handle base integrally formed with the lock base, and a lock cylinder directly mounted on the lock base.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

FIGS. 1 through 4 illustrate an automotive door D having an automotive door structure 40 according to a first embodiment of the present invention. The door structure 40 includes a door panel assembly which comprises an inner panel 1 of resin and an outer panel 2 of resin, and a support frame 3 of metal disposed between the inner and outer panels 1, 2.

Figure 1:
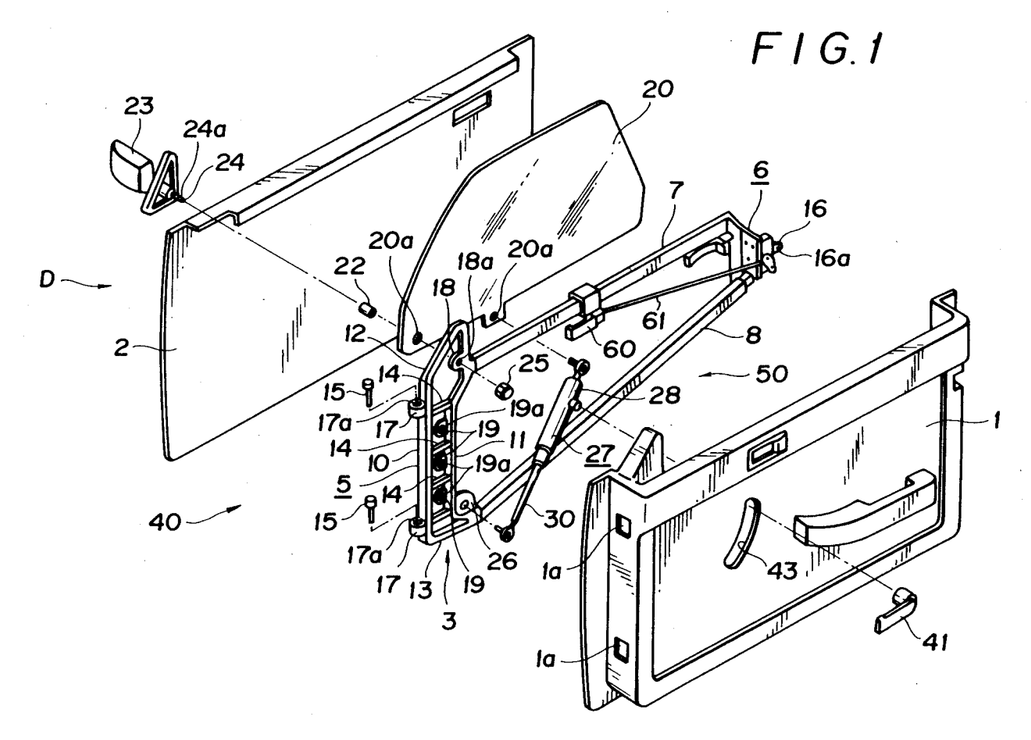
FIG. 1 is an exploded perspective view of an automotive door structure according to a first embodiment of the present invention.

The support frame 3 comprises a front stay 5, a rear stay 6, and upper and lower joint members 7, 8 which interconnect the front and rear stays 5, 6. The front and rear stays 5, 6 are in the form of aluminum die castings, and the joint members 7, 8 are in the form of aluminum extrusions.

The front stay 5 comprises front and rear frames 10, 11, frames 12, 13 interconnecting the upper and lower ends of the front and rear frames 10, 11, and a number of bridge frames 14 interconnecting vertically intermediate portions of the front and rear frames 10, 11. The front frame 10 has on its front edge a pair of attachments 17 by which it is to be connected to an automotive body (not shown), the attachments 17 having respective vertical holes 17a defined therethrough. The rear frame 11 has on its front edge an attachment 18 having a horizontal hole 18a defined therethrough and a number of attachments 19 having respective horizontal holes 19a defined therethrough. The rear stay 6 has an attachment 16 with a horizontal bolt hole 16a defined therethrough.

To assemble the door D, a front portion of the inner panel 1 is fastened to the attachments 19 of the front stay 5 by means of bolts (not shown), and a rear portion of the inner panel 1 is fastened to the attachment 16 of the rear stay 6 by means of a bolt (not shown). Then, the outer panel 2 is joined to the inner panel 1 in covering relation to the frame 3. At this time, the attachments 17 of the front stay 5 are inserted respectively in openings 1a defined in a front wall of the inner panel 1, and shafts 15 fitted respectively in the holes 17a in the attachments 17 are rotatably mounted in respective receivers on the automotive body (not shown).

A door glass sheet 20 is angularly vertically movably mounted on the front stay 5. More specifically, the glass sheet 20 is positioned outside of the frame 3. A collar 22 is fitted in the attachment hole 18a of the front stay 5 and a hole 20a defined in a front corner of the glass sheet 20, and a shaft 24 for supporting a door rearview mirror 23 is fitted in the collar 22, the shaft 24 having threads 24a on its inner end. A nut 25 is threaded over the threads 24a of the shaft 24 from within the automotive body. The door glass sheet 20 is thus angularly vertically movable about the shaft 24.

Figures 2, 3, 5:
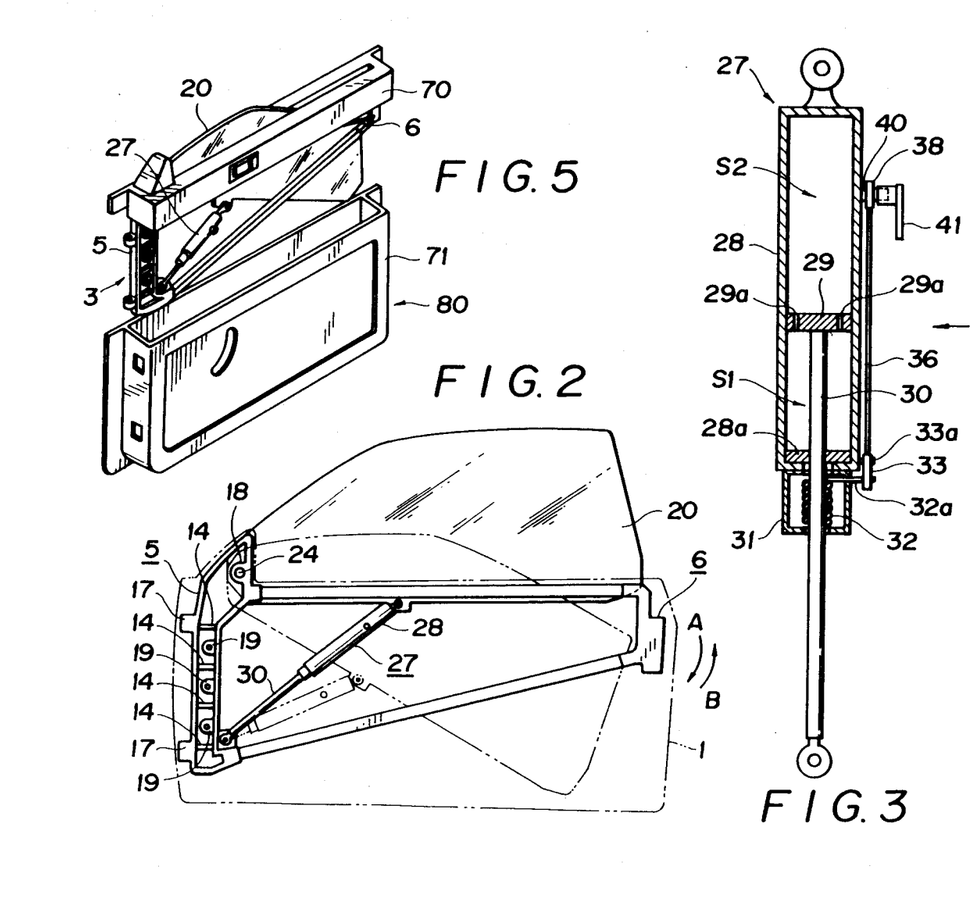
FIG. 2 is a side elevational view of a door glass lifting/lowering device of the door structure shown in FIG. 1.
FIG. 3 is an enlarged longitudinal cross-sectional view of a glass support assembly of the door glass lifting/lowering device shown in FIG. 2.
FIG. 5 is a perspective view of an automotive door structure according to a second embodiment of the present invention.

A flange 26 is formed on the lower rear portion of the front stay 5, and a support assembly 27 which supports the door glass panel 20 is interposed between the flange 26 and the lower edge of the door glass sheet 20. As shown in FIG. 3, the support assembly 27 comprises a cylinder 28 filled with a gas, a piston 29 slidably fitted in the cylinder 28 and dividing the interior space of the cylinder 28 into two chambers S1, S2, and a piston rod 30 having one end fixed to the piston 29. The piston rod 30 is hermetically inserted through a seal 28a on the bottom of the cylinder 28 into the cylinder 28. The piston 29 has a plurality of axial orifices 29a through which the chambers S1, S2 communicate with each other. A tubular body 31 is fixed to the lower end or bottom of the cylinder 28. The piston rod 30 extends downwardly through the lower end of the cylinder 28 and the tubular body 31.

A brake spring 32 disposed tightly around the piston rod 30 is housed in the tubular body 31. The brake spring 32 selectively prevents sliding movement of the piston rod 30. The brake spring 32 has a lower end engaged by the tubular body 31 and an upper end 32a extending out of the tubular body 31 and engaging one end of a bell crank 33 which is pivotally supported on a shaft 33a mounted on the cylinder 28.

The other end of the bell crank 33 is pivotally coupled to one end of a rod 36, the other end of which is pivotally joined to a distal end of a lever 38. The proximal end of the lever 38 is fixed to a rotatable shaft 40 mounted on a side of the cylinder 28. An operating lever 41 is secured to the distal end of the shaft 40. The rotatable shaft 40 extends through an arcuate slot 43 (FIG. 1) defined in the inner panel 1. The operating lever 41 is attached to the rotatable shaft 40 from the compartment side of the inner panel 1.

Figure 4:
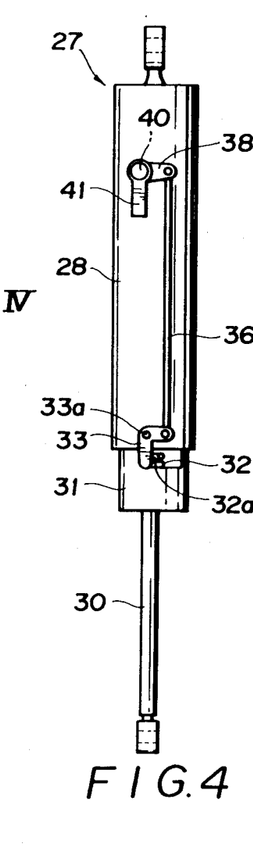
FIG. 4 is a view of the glass support assembly as viewed in the direction indicated by the arrow IV in FIG. 3.

When the operating handle 41 is slightly turned counterclockwise in FIG. 4, the lever 38 is also turned counterclockwise. The bell crank 33 is also turned counterclockwise through the rod 36. The counterclockwise turning movement of the bell crank 33 causes the upper end 32a of the brake spring 32 to move in a direction to spread the brake spring 32 radially outwardly, with the result that the piston rod 30 is released from the brake spring 32. When the operating lever 41 is moved along the arcuate slot 43, the door glass panel 20 is rotated about the shaft 24 in the direction indicated by the arrow A or B in FIG. 2, and hence is lifted or lowered with respect to the door itself. When the door glass sheet 20 is lowered, the piston rod 30 enters the cylinder 28, forcing the gas from the chamber S2 through the orifices 29a into the chamber S1. As the piston rod 29 enters the cylinder 28, the pressure of the gas in the cylinder 28 is increased in proportion to the increase in the mass of the piston rod 29 which enters the cylinder 28 until the gas pressure counterbalances the load from the door glass sheet 20. The position where the gas pressure counterbalances the door glass load may be varied by varying the diameter of the piston rod 29 such that the rate of change of the gas pressure with respect to the mass of the piston rod 29 which enters the cylinder 28 will be changed.

In order to stop the door glass sheet 20 at a desired position, the operating lever 41 is rotated back clockwise to allow the brake spring 31 to clinch the piston rod 30 under its own resiliency, thus fixing the piston rod 30 against movement.

The support assembly 27, the operating lever 41, and components associated therewith jointly serve as a device 50 for lifting and lowering the door glass sheet 20.

A door lock lever 60 is connected to a door lock mechanism through a rod 61. The door can be opened by operating the door lock lever 60.

With the door structure 40, the door glass sheet 20 and the door glass lifting/lowering device 50 which are relatively heavy are supported on the support frame 3 of metal, rather than the inner and outer panels 1, 2. Since the inner and outer panels 1, 2 do not bear large loads, they may be made of resin. As a consequence, the entire door structure 40 may be reduced in weight.

To assemble the door D, the door glass sheet 20 and the support assembly 27 are first installed on the support frame 3, then the support frame 3 is attached to the inner panel 1, and the outer panel 2 is joined to the inner panel 1. Inasmuch as it is not necessary to insert the door glass sheet and its support mechanism into the gap between the inner and outer panels after they have been joined to each other, as is the case with the conventional door structures, the door D can be assembled efficiently with ease.

The door glass sheet 20 is angularly lifted and lowered about the shaft 24, and hence follows a constant path on its movement. Accordingly, no guide member for maintaining such a constant path is necessary. As the door glass sheet 20 is supported on the shaft 24, it does not vibrate in the longitudinal direction of the automobile, and no vibroisolating mechanism for the door glass sheet 20 is needed. The door structure 40 is thus constructed of a reduced number of parts and simple in structure.

One end of the door glass sheet 20 is supported by the shaft 24, which thus bears a portion of the weight of the door glass sheet 20. Consequently, the door glass sheet 20 can be lifted and lowered simply by applying a relatively small force to the operating lever 41. The user can easily lift and lower the door glass sheet 20 because the door glass sheet 20 can be vertically moved simply by moving the operating lever 40 upwardly and downwardly along the arcuate slot 43.

The front and rear stays 5, 6 are coupled to each other by the joint members 7, 8. Therefore, the longitudinal dimension or length of the support frame 3 can easily be varied by varying the length of the joint members 7, 8. The door structure 40 can thus be adapted to plural automobile types by making minimum dimensional modifications.

The shaft 24 doubles as a shaft for supporting the door glass panel 20 and a shaft for supporting the door rearview mirror 23. This allows the number of parts used to be cut down.

FIG. 5 shows an automotive door structure 80 according to a second embodiment of the present invention. Those parts shown in FIG. 5 which are identical to those shown in FIGS. 1 through 4 are denoted by identical reference numerals, and will not be described in detail.

The door structure 40 according to the first embodiment has inner and outer panels 1, 2 which are separable from each other in the transverse direction of the automobile. The automotive door structure 80 however has upper and lower panels 70, 71 which are vertically separable from each other. The door structure 80 is assembled as follows:

First, the door glass 20 and the support assembly 27 are installed on the support frame 3. Then, the support frame 3 is fixed to the upper panel 70. The support frame 3 with the assembled components is inserted into the lower panel 71 until the upper edge of the upper panel 70 is fitted in the upper edge of the lower panel 71. The support frame 3 is fixed to the lower panel 71. Finally, the operating lever 41 is secured to the support assembly 27 from outside of the lower panel 71.

The door structure 80 offers the same advantages as those of the door structure 40.

The lower end of the door structure 80 is closed. Therefore, foreign matter such as water, sand, and dust is prevented from entering the door structure 80 from the lower side of the door.

An automotive door structure 100 according to a third embodiment of the present invention will hereinafter be described with reference to FIGS. 6 through 15.

Figure 6:
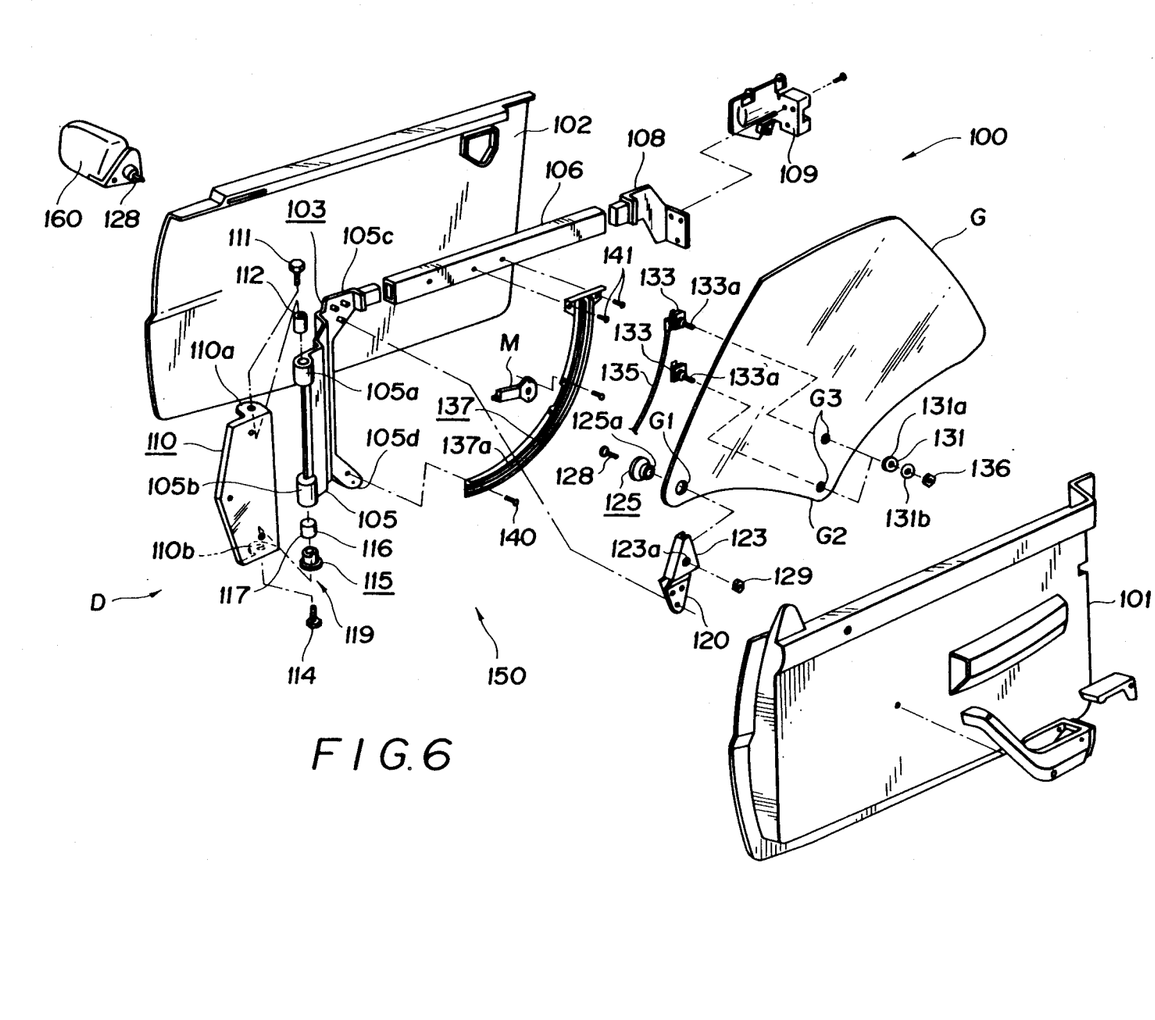
FIG. 6 is an exploded perspective view of an automotive door structure according to a third embodiment of the present invention.

The automotive door structure 100 comprises an inner panel 101 of resin, an outer panel 102 of resin, and a support frame 103 of metal disposed between the inner and outer panels 101, 102.

The support frame 103 comprises a vertical frame 105 and a horizontal frame 106 having a front end attached to the upper end of the vertical frame 105. The vertical frame 105 is in the form of an aluminum die casting, and the horizontal frame 106 is in the form of an aluminum extrusion.

An upper tubular member 105a and a lower tubular member 105b, which serve as hinges, are integrally formed with the front edge of the vertical frame 105 at upper and lower positions thereon. The upper and lower tubular members 105a, 105b are vertically aligned with each other. The vertical frame 105 also has brackets 105c, 105d on the rear edge thereof at upper and lower positions thereon. A lock mechanism 109 is mounted on the rear end of the vertical frame 106 through a bracket 108.

Figures 7, 9, 10:
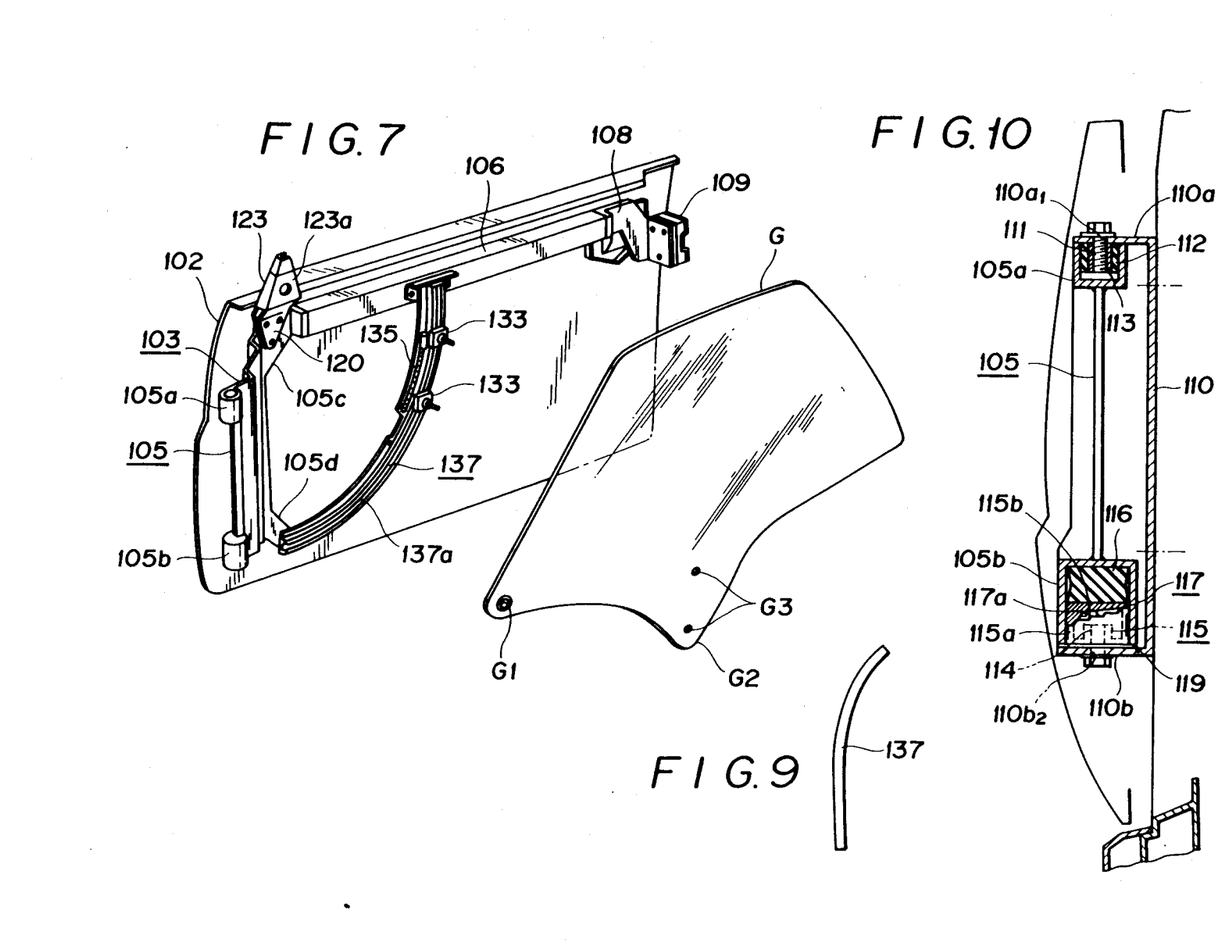
FIG. 7 is a perspective view of a door glass lifting/lowering device of the door structure illustrate in FIG. 6.
FIG. 9 is a front elevational view of a guide member of the door glass lifting/lowering device shown in FIG. 8.
FIG. 10 is an enlarged vertical cross-sectional view of door hinges of the door structure shown in FIG. 7.

A bracket 110 which is fixed to an automotive body (not shown) has upper and lower frames 110a, 110b extending horizontally from upper and lower edges, respectively, of the bracket 110. As shown in FIG. 10, the upper flange 110a has an attachment hole 110a1 through which a bolt 111 is inserted. The bolt 111 has a tip end threaded in a cylindrical member 113 fixedly mounted in a bushing 112 of resin. The bushing 112 is thus fixed to the flange 110a. The upper tubular member 105a is rotatably fitted over the bushing 112.

The lower flange 110b has an attachment hole 110b2 through which a bolt 114 is inserted. The bolt 114 has a tip end threaded in an internally threaded hole defined in a support member 115 which is fixed to the lower flange 110b.

The support member 115 has an outer tubular portion 115a which has on its upper surface a plurality of successive steps 115b positioned at successively increasing heights and serving as cam surfaces. The lower tubular member 105b is rotatably fitted over the tubular portion 115a, with a rubber damper 116 disposed in the lower tubular member 105b. A disc 117 of metal is fixed to the lower end surface of the rubber damper 116. The outer peripheral edge of the disc 117 is secured to the inner peripheral surface of the lower tubular member 105b through engagement of projections, for example. The disc 117 has a downwardly extending foot 107a on its lower surface which is held in engagement with the stepped cam surfaces 115b. The support member 115, the rubber damper 116, and the engaging foot 117a are held coaxially with the tubular members 105a, 105b. These members 115b, 115, 117a jointly constitute a door checker mechanism 119 for holding the door D in a certain position such as a fully open position.

When the door D is opened or closed, the upper tubular member 105a is turned around the bushing 112, and the lower tubular member 105b is turned around the tubular portion 115a of the support member 115. At this time, the engaging foot 117a runs successively over the stepped cam surfaces 115b. Thus, the door D is retained in its successive open positions, and finally held in the fully open position.

Figure 8:
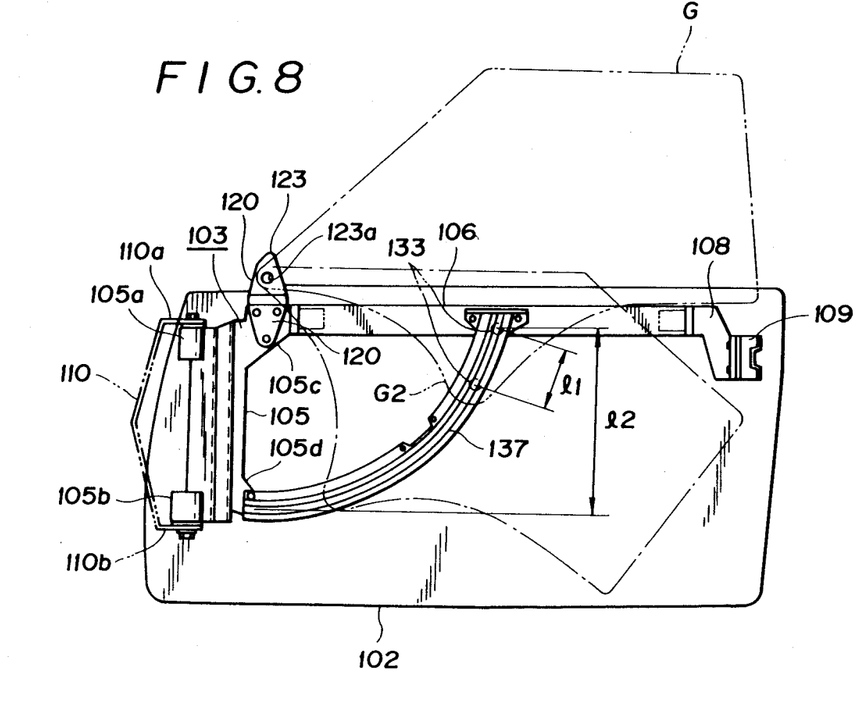
FIG. 8 is a side elevational view of the door glass lifting/lowering device shown in FIG. 7.

As illustrated in FIGS. 6, 7, and 8, a support plate 120 is fixed to the inner surface of the bracket 105c. A bracket 123 having a groove for insertion of an edge of a glass sheet G therein is attached to the upper portion of the support plate 120. The bracket 123 has an attachment hole 123a defined therein. To pivotally attach the door glass sheet G to the support plate 120, the front end of the door glass sheet G is inserted in the groove in the bracket 123 such that an opening G1 defined in the front end of the door glass sheet G is held in registry with the attachment hole 123a. Then, a small-diameter shaft 125a of a bushing 125 is inserted in the attachment hole 123a and the opening G1. The bushing 125 is fastened to the bracket 123 on its outer side by means of a bolt 128 and a nut 129. The door glass sheet G thus attached is angularly movable vertically about the small-diameter shaft 125a of the bushing 125. The bolt 128 doubles as an attachment by which a door rearview mirror 160 is installed on the door D. Thus, the bushing 125 serves as a support shaft for the mirror 160.

The door glass sheet G has a lower central edge G2 projecting downwardly and having a pair of vertically spaced small attachment holes G3 defined therein. Small-diameter shafts 131a of bushings 131 are rotatably inserted in the small attachment holes G3, respectively. Bolts 133a of slide shoes 133 are inserted into the respective shafts 131a from the side of the outer panel 102. Nuts 136 with washers 131b are threaded over the ends of the bolts 133a, respectively, thus securing the slide shoes 133 to the door glass sheet G.

A flexible wire 135 coupled to the drive shaft of a motor M is connected to the upper slide shoe 133. The slide shoes 133 also serve as support members for the door glass sheet G. As illustrated in FIG. 8, since the door glass sheet G is lifted and lowered on its angular movement about the bushing shaft 125a, the path along which the slide shoes 133 move is of an arcuate configuration extending about the shaft 125a and along a guide member 137 (described later). Vibration of the door glass sheet G can effectively be reduced by increasing the distance L1 between the two slide shoes 133. Even if the distance between the slide shoes 133 is increased, because the vertical dimension l2 of the path of movement of the shoes 133 is small, the vertical width of the door panels 101, 102 is not substantially increased.

Between the vertical and horizontal frames 105, 106, the guide member 137 is disposed which is made of metal, the guide member 137 having a front end attached to the bracket 105d on the lower end of the vertical frame 105 by means of bolts 140. The guide member 137 has an arcuate shape, as viewed in side elevation, extending about the shaft 125a about which the door glass sheet G is swingable. As shown in FIG. 9, the guide member 137, as viewed in front elevation, is gradually curved inwardly, and curved to a greater extent at its upper end. The guide member 137 has an engaging groove 137a defined in its longitudinal direction, and the slide shoes 133 are slidably fitted in the groove 137a. The motor M is mounted centrally on the guide member 137. As described above, the drive shaft of the motor M is connected to the flexible wire 135 joined to the upper slide shoe 133. The support plate 120, the slide shoes 133, the guide member 137, the motor M, and the flexible wire 135 jointly serve as a door glass lifting/lowering device 150.

In order to lift or lower the door glass sheet G, the motor M is energized by operating a switch (not shown) positioned near the driver's seat in the automobile. Rotation of the drive shaft of the motor M is transmitted to the flexible wire 135 to pull o extend the wire 135 for thereby sliding the slide shoes 133 along the guide member 137. As described above, the upper end of the guide member 137 is curved inwardly. Therefore, when the door glass sheet G is lifted, the upper edge of the glass sheet G first abuts against a seal member (not shown) between the upper edges of the panels 101, 102 and then the glass sheet G is elevated while it is being tilted into the passenger compartment of the automobile. Accordingly, the inner side of the glass sheet G is reliably held against the seal member, and hence is sealed effectively.

As shown in FIGS. 11 through 15, the door lock mechanism 109 has a lock base 109a of resin with which a base 109b of an outer door handle 109c is integrally formed. The lock base 109a houses therein various lock components such as a latch for engaging a striker in the automobile body, a ratchet lever for engaging the latch to prevent the latch from returning, and an open lever for releasing the latch from the striker.

The outer door handle 109c is swingably mounted on the lock base 109a. The outer door handle 109c has an upper end positioned inwardly of the outer panel 102, and an upper end of an outer door handle rod 109d which extends vertically is pivotally coupled to the upper end of the outer door handle 109c. The lower end of the outer door handle rod 109d is fixedly coupled to one end of an open lever 109e. When the open lever 109e is moved downwardly in FIG. 11, it releases the latch from the striker. A lock cylinder 109f with its keyhole opening outwardly is mounted in a lower portion of the lock base 109a. A cam plate 109g having a cam engaging portion 109h extending laterally is integrally fixed to the inner end of the lock cylinder 109f.

A plate 109j is fixed to the lock base 109a inwardly of the open lever 109e. A lock cam member 109i is swingably attached to the inner side of the plate 109j through a bolt (not shown). The lock cam member 109i has an end held against the upper surface of the cam engaging portion 109h, and a cam ring extends downwardly from the other end of the lock cam member 109i.

The plate 109j has a bent portion to which a crank 109k is pivotally connected by a bolt. The crank 109k has an upper arm the end of which is inserted through an opening defined in the other end of the open lever 109e. The crank 109k also has a lower arm with a horizontal narrow groove defined therein, and a rod 109l which is actuated by an inside door handle and an inside lock knob has a bent end extending through the horizontal narrow groove in the lower arm of the crank 109k. The bent end of the rod 109l also extends through the opening of the cam ring of the lock cam member 109i i.

Figures 11, 12, 13, 14:
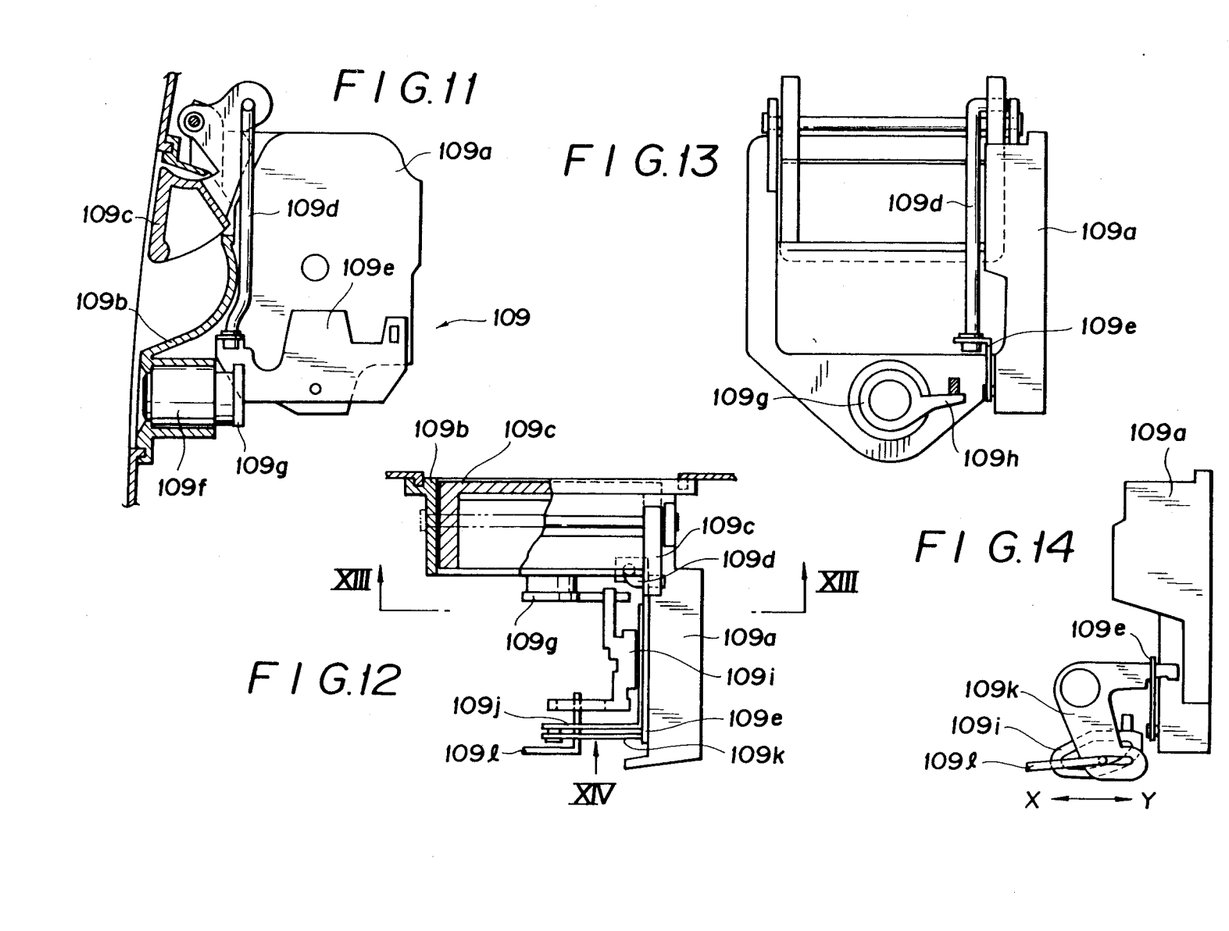
FIG. 11 is a side elevational view, partly in cross section, of a door lock mechanism of the door structure shown in FIG. 6.
FIG. 12 is a plan view, partly broken away, of the door lock mechanism shown in FIG. 11.
FIG. 13 is a cross-sectional view taken along line XIII—XIII of FIG. 12.
FIG. 14 is a view of the door lock mechanism as viewed in the direction indicated by the arrow XIV in FIG. 12.
Figure 15:
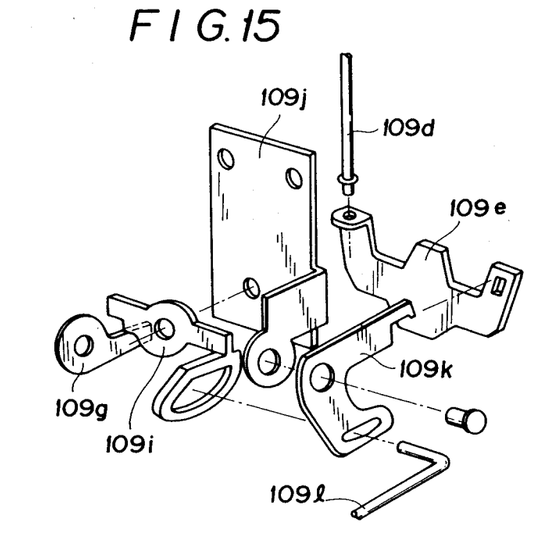
FIG. 15 is an exploded perspective view of the major components of the door lock mechanism.

FIG. 14 shows the condition of the door lock mechanism 109 when the lock cylinder 109f is in an unlock position. When the rod 109l is moved in the direction indicated by the arrow X in FIG. 14 by the door opening action of the inside door handle, the crank 109 is turned clockwise in FIG. 14. The end of the upper arm of the crank 109k lowers the other end of the open lever 109e, bringing the striker and the latch into disengagement from each other thereby to open the door. At this time, said one end of the open lever 109e is prevented from moving as it is coupled to the lower end of the outer door handle rod 109d. Accordingly, upon movement of the road 109l in the direction indicated by the arrow X in FIG. 14, the open lever 109e is swung clockwise in FIG. 11. When the rod 109d is moved downwardly in FIG. 11 by the door opening action of the outer door handle 109c, the open lever 109e is turned counterclockwise in FIG. 11, thereby allowing the door to be open.

When the plate 109g is turned counterclockwise in FIG. 13 by a key (not shown) or the rod 109l is moved in the direction indicated by the arrow Y in FIG. 14 by the door locking action of the inside lock knob (not shown), the lock cam member 109i is swung to lower the cam ring thereof, so that the door is locked. If the plate 109g is turned counterclockwise, then the cam engaging portion 109h pushes upwardly the end of the lock cam member 109i. If the rod 109l is moved in the direction indicated by the arrow Y, then since the open lever 109e is in its upper limit position in FIG. 14, the crank 109k is prevented from being turned counterclockwise. As the rod 109l is moved in the direction indicated by the arrow Y in FIG. 14, the cam ring of the lock cam member 109i through which the bent end of the rod 109l extends is lowered.

Since the guide member 137 between the vertical and horizontal frames 105, 106 is made of metal, the guide member 137 doubles as a reinforcing member for the frames 105, 106, in addition to performing the function to guide the door glass sheet G. Accordingly, any reinforcing frame between the vertical frame 105 and the horizontal frame 106 may be dispensed with. The sufficient rigidity of the door structure 100 is maintained, and at the same time the number of parts used is reduced.

The tubular members 105a, 105b serving as hinges are integrally formed with the vertical frame 105 of the door structure 100. Thus, the tubular members 105a, 105b can easily be held in exact axial alignment with each other at the time the vertical frame 105 is manufactured. The number of parts of the door structure 100 is further reduced since the tubular members 105a, 105b are integrally formed with the vertical frame 105.

The door checker mechanism 119 is constructed of only the cam surfaces 115b, the rubber damper 116, and the engaging foot 117a. Consequently, the door checker mechanism 119 is made up of a small number of components and simple in construction.

The cam surfaces 115b, the rubber damper 116, and the engaging foot 117a are vertically arranged coaxially with the tubular members 105a, 105b serving as the door hinges. Therefore, the door checker mechanism 119 does not include any members having horizontally large dimensions. The door checker mechanism 119 is thus compact particularly in the horizontal direction.

Inasmuch as the door checker mechanism 119 is disposed in the tubular member 105b, sand, dust, and other foreign matter are prevented from finding its way into the door checker mechanism 119, which is protected from damage or malfunctioning.

In the door lock mechanism 109, the outer handle base 109b is integral with the lock base 109a, and the lock cylinder 109f is mounted in the lock base 109a and directly swings the lock cam member 109i. Actually, the base 109b of the outer door hand 109c is part of the lock base 109a. Accordingly, the outer handle base and the lock cylinder rod which have heretofore been necessary are dispensed with, and the length of the outer handle rod 109d is minimized. As a Consequence, the number of parts of the door lock mechanism 109 is reduced, and so is the weight thereof.

Stated otherwise, the door lock mechanism 109 is manufactured as a unit. With the unitary door lock mechanism 109, it is possible to dispense with a joint adjusting mechanism between the rod 109d and the open lever 109e, and the door lock mechanism 109 can be assembled with increased accuracy. The door lock mechanism 109 is prevented from suffering entanglement due to assembling inaccuracies, and can be operated highly smoothly and effectively.

In the door glass lifting/lowering device 150, the slide shoes 133 are angularly moved about the shaft 125a of the door glass sheet G while sliding along the arcuate guide member 137, thereby lifting or lowering the door glass sheet G. The door glass lifting/lowering device 150 does not require a glass holder, a link mechanism for lifting and lowering the glass sheet, and channels for guiding the glass sheet, which have heretofore been employed. As a result, the door glass lifting/lowering device 150 is constructed of as small a number of parts as possible, and is structurally simple.

Figures 16, 17:
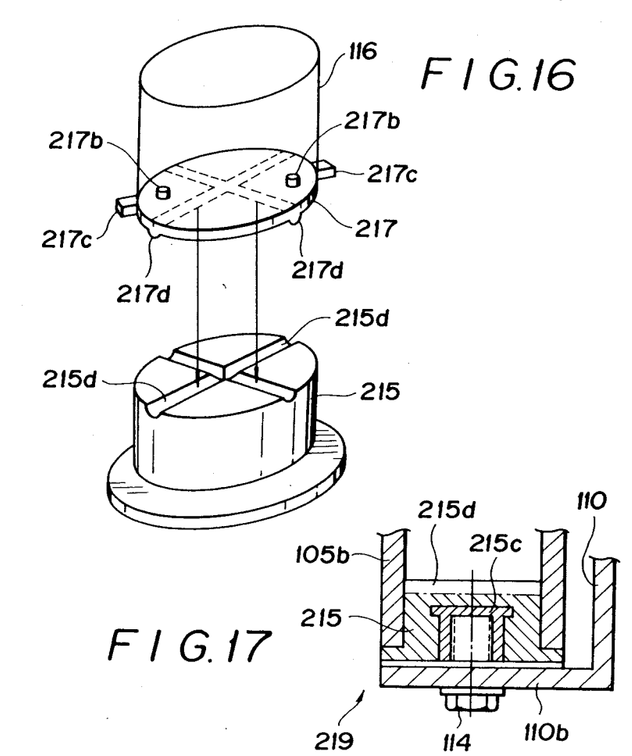
FIG. 16 is an exploded perspective view of a modification of a door checker mechanism of the door structure shown in FIG. 6.
FIG. 17 is a fragmentary vertical cross-sectional view of the door checker mechanism shown in FIG. 16.

FIGS. 16 and 17 show a modified door checker mechanism 219. Those parts shown in FIGS. 16 and 17 which are identical to those of the door checker mechanism 119 are denoted by identical reference numerals, and will not be described in detail.

A disc 217 of metal is attached to the lower surface of a rubber damper 116. The disc 217 has engaging projections 217b on its upper surface which engage the lower surface of the rubber damper 116, so that the disc 217 is secured to the rubber damper 116. The disc 217 also has a pair of diametrically opposite teeth 217c on its outer periphery which engage the tubular member 105b. The disc 217 is thus also secured to the tubular member 105b. The disc 217 has on its lower surface ridges 217d extending in a crisscross pattern.

As shown in FIG. 16, a support member 215 is in the form of a cylinder made of resin. A metal core 215c is integrally embedded in the support member 215, and has crisscross grooves 215d which are complementary in shape to the ridges 217d on the lower surface of the disc 217. The support member 215 is fixed to the lower flange 110b by the bolt 114 which is inserted from below the lower flange 110b and has its end threaded into the core 215c.

As indicated by the arrows in FIG. 16, when the door is assembled, the lower surface of the disc 217 is held against the upper surface of the support member 215, and the ridges 217d on the lower surface of the disc 217 are aligned with the cam grooves 215d in the upper surface of the support member 215. The ridges 217d are resiliently forced into the grooves 215d by the rubber damper 116.

The support member 215 is secured to the bracket 110 coupled to the automobile body, whereas the rubber damper 116 and the disc 217 are rotatable with the door. When the door is opened 90° from the closed position, the disc 217 is also rotated −90° in unison with the door until the crisscross ridges 217d are aligned with the crisscross grooves 215d of the support member 215, whereupon the door is retained in the open position.

The door checker mechanism 219 is constructed of the support member 215 having the cam grooves 215d, the disc 217 having the engaging ridges 217d, and the rubber damper 116 as an urging means for resiliently urging the engaging ridges 217d to engage in the cam grooves 215d. The door checker mechanism 219 is thus made up of a reduced number of parts, and is of a simple arrangement.

The support member 215, the disc 217, and the rubber damper 116 are vertically arranged in coaxial alignment with the tubular members or door hinges 105a, 105b. Like the door checker mechanism 119, the door checker mechanism 219 does not have members having large horizontal dimensions. As a consequence, the door checker mechanism 219 is compact especially in the horizontal direction.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A door structure for an automobile having an automobile body, comprising:
   a door panel assembly of resin adapted to be openably and closably mounted on the automobile body;
   a door glass sheet vertically movably disposed in said door panel assembly;
   a lifting/lowering device for lifting and lowering said door glass sheet, said lifting/lowering device being disposed in said door panel assembly; and
   a door frame of a rigid material disposed in said door panel assembly and supporting said door glass sheet and said lifting/lowering device;
   a door lock mechanism for locking said door panel assembly on the automobile body, wherein
   said door frame comprises a vertical frame having door hinges, a horizontal frame connecting said vertical frame to said door lock mechanism, and a guide member for guiding said door glass sheet as it is lifted or lowered, said guide member extending between said vertical frame and said horizontal frame.

2. A door structure according to claim 1, wherein said door lock mechanism comprises a lock base housing door lock members therein, an outer door handle base integrally formed with said lock base, and a lock cylinder directly mounted on said lock base.

3. A door structure according to claim 1, wherein said lifting/lowering device comprises said guide member, and a shaft to which said door glass sheet is pivotally coupled such that said door glass sheet can be lifted and lowered with respect to said door panel assembly when the door glass sheet is angularly moved about said shaft, and wherein
   said guide member is of an arcuate shape extending about said shaft.

4. A door structure according to claim 3, further including a door rearview mirror, wherein
   said shaft supports said door rearview mirror.

5. A door structure according to claim 3, wherein said lifting/lowering device comprises a slide assembly fixed to said door glass sheet and slidably engaging said guide member of the arcuate shape.

6. A door structure according to claim 5, wherein said slide assembly comprises a plurality of slide shoes spaced from each other and slidably engaging said guide member.

7. A door structure according to claim 6, wherein said plurality of slide shoes comprises a pair of slide shoes coupled to said door glass sheet through holes therein.

8. A door structure for an automobile having an automobile body, comprising:
   a door panel assembly of resin adapted to be openably and closably mounted on the automobile body;
   a door glass sheet vertically movably disposed in said door panel assembly;
   a lifting/lowering device for lifting and lowering said door glass sheet, said lifting/lowering device being disposed in said door panel assembly; and
   a door frame of a rigid material disposed in said door panel assembly and supporting said door glass sheet and said lifting/lowering device;
   door hinges by which said door panel assembly is adapted to be openably and closably mounted on the automobile body, and a door checker mechanism for holding said door panel assembly at a predetermined open position, wherein
   said door checker mechanism comprises:
   a cam member fixed to said door panel assembly or adapted to be mounted on the automobile body, and having a cam surface;
   an engaging member adapted to be mounted on the automobile body or fixed to said door panel assembly, and engaging said cam surface of said cam member;
   urging means for normally urging said engaging member toward said cam surface; and
   wherein said cam surface, said engaging member, and said urging means are disposed coaxially with said door hinges.

9. A door structure according to claim 8, wherein said door checker mechanism further includes a tubular member surrounding said cam surface, said engaging member, and said urging means.

* * * * *